Figure 1:
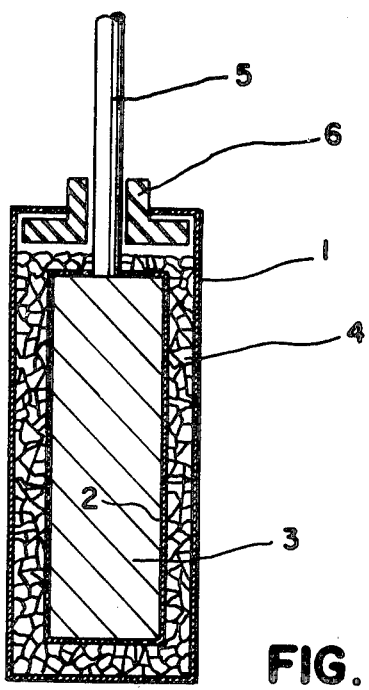

United States Patent [19]

Kunze

[11] 4,382,117
[45] May 3, 1983

[54] SEPARATOR FOR ELECTROCHEMICAL HIGH TEMPERATURE CELL

[75] Inventor: Dieter Kunze, Kelkheim, Fed. Rep. of Germany

[73] Assignee: Varta Batterie Aktiengesellschaft, Hanover, Fed. Rep. of Germany

[21] Appl. No.: 259,429

[22] Filed: May 1, 1981

Related U.S. Application Data

[63] Continuation of Ser. No. 73,621, Sep. 10, 1979, abandoned.

[30] Foreign Application Priority Data

Nov. 2, 1978 [DE] Fed. Rep. of Germany ....... 2847464

[51] Int. Cl.³ ............................................. H01M 2/18
[52] U.S. Cl. .................................... 429/132; 429/247; 429/251
[58] Field of Search .............. 429/247, 129, 103, 251, 429/112, 132, 131, 136

[56] References Cited

U.S. PATENT DOCUMENTS 2,176,173 10/1939 Fuller et al. .......................... 429/80
2,738,374 3/1956 Fuller et al. ......................... 429/132
4,172,926 10/1976 Shimotake et al. ................. 429/221

Primary Examiner—Anthony Skapars
Attorney, Agent, or Firm—Weiser, Stapler & Spivak

[57] ABSTRACT

A separator for electrochemical high temperature cells having solid positive and negative electrodes and a molten liquid electrolyte formed through a poured accumulation of ceramic particles in which the electrolyte is mainly fixated. The porosity of the accumulation is especially high when there is added to the voids in the accumulation of particles also their own intrinsic porosity, to the degree that this consists of open pores. By using ion conducting particles, the ion penetration can be further enhanced.

15 Claims, 2 Drawing Figures

SEPARATOR FOR ELECTROCHEMICAL HIGH TEMPERATURE CELL

This is a Streamlined continuation of application Ser. No. 073,621, filed Sept. 10, 1979 now abandoned.

The invention relates to a separator for electrochemical high temperature cells having a solid positive electrode, a solid negative electrode, and a molten liquid electrolyte which is mainly fixated in the separator.

An example of such high temperature systems consists of the cell Li-Al/LiCl-KCl/FeS$_x$ (where $x = 1$ or 2). The electrolytes of such cells are molten liquid salt mixtures of mainly eutectic composition. Frequently an LiCl-KCl mixture is used, because it is characterized by good ion permeability and is also inexpensive. The negative electrode consists of a light metal of the group Li, Na, Ca, Be, Mg and Al and is preferably an Li electrode and is strengthened through alloy formation with Al.

A very important prerequisite for the use of such high temperature cells, as for example in the field of electric traction, is the availability of a separator which is cost-effective and porous. Its principal task is the prevention of any electron conduction between the electrodes while simultaneously providing the opportunity for ion flow through the electrolyte which is as unimpeded as possible. In addition, the separator must prevent an outmigration of active material from the electrodes, e.g. of Li-Al and FeS$_x$ in the above described cell, because both of these substances are present in the form of powder and penetration of the separator by these fine particles leads to short-circuits and loss of capacity.

Unusual requirements are imposed upon the thermal resistivity of the separator when one takes into account that the operating temperature of an Li-Al/FeS$_x$ cell is about 450° C. At such temperatures there occur, in addition to the volume changes of the electrodes caused by the reaction, also thermal expansions, so that the mechanical stability of the separator also has special importance in this situation.

From U.S. Pat. No. 3,510,359 there is known a separator which consists of temperature resistant materials such as beryllium oxide (BeO), thorium oxide (ThO$_2$), magnesium oxide (MgO), lithium aluminate (LiAlO$_2$), boron nitride (BN), silicon nitride (Si$_3$N$_4$), aluminum nitride (AlN) or mixtures of these. Because these ceramic substances are not themselves ion conductors, the separator made of them must have a "open" structure, in order to insure adequate ion permeability. Therefore, the separator has been made in the form of an open frame which is flanked by the two electrodes or one has kept the electrodes spaced by means of pins. Also, grids of rods, or even fabrics of ceramic have been used as separators. The latter may be made of boron nitride (BN). They come closest to withstanding the considerable deformation forces which stem from the volume and structure changes of the electrodes in the operating cell and are therefore preferably used. However, as disadvantages of ceramic fiber material there must be accepted at present its corresponding limitation to the raw material BN, its poor wettability by the molten electrolyte, which is accompanied by impaired ion permeability, and expensive manufacture.

Accordingly, it is an object of the invention to replace the known ceramic separator structures with a construction which is simpler and which is less sensitive to mechanical forces.

This and other objects which will appear are achieved in accordance with the invention by forming the separator of a particle accumulation of ceramic material.

In a preferred embodiment of the invention, the particles in the accumulation are themselves porous. Since ceramic bodies of any desired porosity can be made, e.g. filter plates, the crushing of such bodies yields particles which, by virtue of their own porosity, substantially increase volumetric fraction of the interstitial voids in a separator accumulation embodying the invention. Therefore, such separators can be largely custom-tailored for a desired ion permeability, in accordance with the accumulation density or particle size and the particle porosity.

The crushing of the raw material can be carried out in a mill, for example. Through sieve fractionation one obtains particles of the size suitable for the accumulation, which should be in the region of 0.1 to 2 mm, preferably of 0.2 to 1 mm.

In the accumulation the total porosity, which is composed of the accumulation voids between the particles, and in some cases of their own pore volume, should be between 20% and 80% by volume, preferably 40% to 70% by volume. Of course the particle porosity is to be taken into account only to the degree that open pores are involved.

The thickness of the layer formed by the particle accumulation, which is practically identical to the electrode separation, may be between 1 and 5 mm.

The manufacturing advantage of the separator embodying the invention is that a particle accumulation can be more readily produced than a cohesive shape, whether this be a fabric, a grid, or a rigid porous plate. Compared to a plate, an accumulation of particles can also better absorb mechanical loads which are occasioned through volume displacements of the operating electrodes because it cannot be destroyed by deformations instantaneously.

Such a layer with a relatively coarsely dispersed solid phase is also superior to powder separators because of its better ion permeability and better workability. Moreover, there exists the possibility of utilizing ion-conducting particles which further enhances the ion penetration.

In addition to other, known ceramic materials, such as beryllium oxide, aluminum oxide or zirconium dioxide, magnesium oxide or aluminum nitride, for example, are also sufficiently inert in respect to the unusual corrosion requirements of an Li-Al/FeS$_x$ cell and constitute a material well suited for the separator according to the invention.

Because the electrolyte is mainly to be fixated in the separator, the interstices between the particles must be filled with the electrolyte before putting a cell into operation. This filling can take place by suspension of the particles in the molten electrolyte in a vacuum (for a eutectic LiCl-KCl mixture above 350°). In so doing, it is advantageous to insert one of the electrodes previously into the suspension in such manner that there arises an integral cell element in the form of an easily handleable plate.

Figure 2:
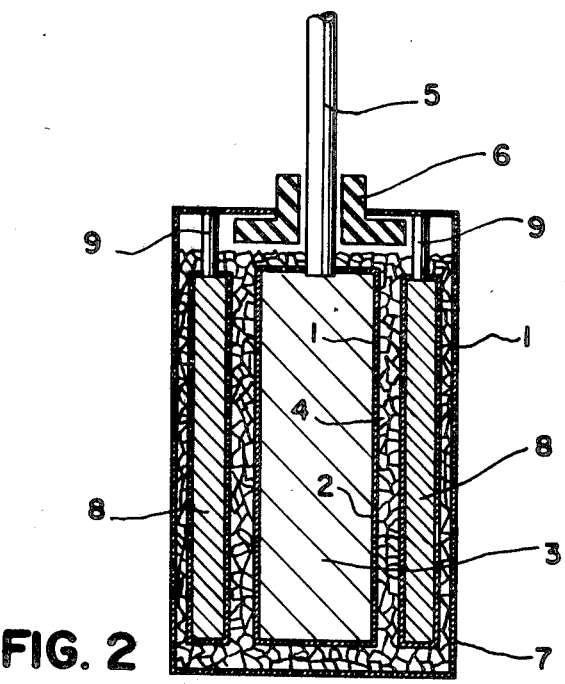

For further details, reference is made to the discussion which follows in light of the accompanying drawings wherein FIG. 1 shows an embodiment of an electrode enclosed in a separator embodying the present invention, and FIG. 2 shows an alternative embodiment of the present invention.

Referring to FIG. 1, this shows diagrammatically a construction as described above. In a steel cavity (not shown) which is lined with a wire mesh 1, there is positioned in the middle an electrode 3 enveloped in a ceramic particle retention fabric 2 made, for example, of zirconium dioxide, and then the space which remains free is filled with the molten liquid electrolyte and the solid particles 4. The electrode takeoff conductor 5 is surrounded by electrical insulation 6. After evacuation and rigidifying of the suspension, the structural element illustrated in FIG. 1 can be removed from the cavity and can be easily introduced into a prefabricated cell container with two counter electrodes. In the latter, this structural element is spatially fixed by means of the pocket formed by wire mesh 1.

FIG. 2 shows an alternative solution for arriving at a stable structure. Here the entire interior space of the cell housing 7, to the extent it is not occupied by the positive electrode 3 and the negative counter electrodes 8 and their takeoff conductor 9, is filled with the particle accumulation. The remaining components of the cell correspond to those of FIG. 1.

We claim:

1. Separator for electrochemical high temperature cells having a solid positive electrode, a solid negative electrode, and a molten liquid electrolyte which is mainly fixated in the separator, the electrodes being subject to volume changes caused by reaction and thermal expansion, wherein
   the separator is formed by an accumulation of particles of ceramic material, said accumulation having been formed by pouring the particles into the previously formed space to be occupied by the separator, thereby producing a coarsely dispersed solid phase capable of absorbing the mechanical loads due to said volume changes.

2. The separator of claim 1 wherein
   the particles in the accumulation are porous.

3. The separator of claim 1 wherein
   the particles in the accumulation are ion conducting.

4. The separator of claim 1 wherein
   the size of the particles in the accumulation is in the range of 0.1 to 2 mm and preferably in the range of 0.2 to 1 mm.

5. The separator of claim 1 wherein
   the total porosity of the particle accumulation, consisting of the interstices between the particles in the accumulation and to the degree present the open pore fraction of the particles themselves amounts to between 20% and 80% by volume, and preferably between 40% and 70% by volume.

6. The separator of claim 1 wherein
   the particle accumulation filled with electrolyte encloses an electrode and constitutes together with that electrode a plate which can be handled at room temperature.

7. The separator of claim 1 wherein
   there are voids between particles in the accumulation to receive liquid electrolyte.

8. The separator of claim 1 wherein the particles are of crushed ceramic.

9. The separator of claim 7 wherein
   the particle accumulation is maintained in the shape of a layer during cell operation only by confinement between other adjacent components of the cell.

10. The separator of claim 9 wherein
    the thickness of the layer formed by the particle accumulation amounts to about 1 to 2.5 mm.

11. The separator of claim 9 wherein
    the components confining the particle accumulation in the shape of a layer are a wire mesh and a retention fabric.

12. Separator for electrochemical high temperature cells having a solid positive electrode, a solid negative electrode, and a molten liquid electrolyte which is mainly fixated in the separator wherein
    the separator is formed by a fill of irregular particles of ceramic material poured into a previously defined free space.

13. The separator of claim 12 which is made by the method including the steps of filling the free space between a particle retention fabric and a wire mesh with the molten electrolyte and the ceramic particles.

14. The separator of claim 13 wherein the wire mesh forms a pocket and the fabric envelopes an electrode positioned in the middle of the pocket.

15. The separator of claim 12 wherein the particles are filled into the entire interior space of the housing of the cell, to the extent that space is not occupied by the positive and negative electrodes and takeoff conductor.

* * * * *